(12) United States Patent
Sekizawa et al.

(10) Patent No.: US 12,085,308 B2
(45) Date of Patent: Sep. 10, 2024

(54) AIR CONDITIONING SYSTEM

(71) Applicant: Hitachi Global Life Solutions, Inc., Tokyo (JP)

(72) Inventors: Mitsuru Sekizawa, Tokyo (JP); Yuuiti Sato, Tokyo (JP); Kazuhito Matsuzaki, Tokyo (JP)

(73) Assignee: Hitachi Global Life Solutions, Inc., Tokyo (JP)

( * ) Notice: Subject to any disclaimer, the term of this patent is extended or adjusted under 35 U.S.C. 154(b) by 0 days.

(21) Appl. No.: 18/125,819

(22) Filed: Mar. 24, 2023

(65) Prior Publication Data

US 2023/0228433 A1 Jul. 20, 2023

Related U.S. Application Data

(63) Continuation of application No. 17/760,708, filed as application No. PCT/JP2019/047441 on Dec. 4, 2019, now Pat. No. 11,649,975.

(51) Int. Cl.
*F24F 7/06* (2006.01)
*F24F 11/74* (2018.01)

(52) U.S. Cl.
CPC ............ *F24F 7/06* (2013.01); *F24F 11/74* (2018.01)

(58) Field of Classification Search
CPC .... F24F 7/06; F24F 11/74; F24F 3/001; F24F 7/003; F24F 8/108; F24F 3/167; F24F 2003/003; F24F 2003/005; F24F 2110/40; F24F 7/007
See application file for complete search history.

(56) References Cited

U.S. PATENT DOCUMENTS

| | | | |
|---|---|---|---|
| 3,122,201 A | | 2/1964 | Ashley |
| 3,320,404 A | * | 5/1967 | Roux .................... F24F 13/068 165/53 |
| 4,693,175 A | * | 9/1987 | Hashimoto ............ F24F 3/167 55/385.2 |
| 4,699,640 A | * | 10/1987 | Suzuki .................... F24F 7/10 55/385.2 |
| 5,096,477 A | * | 3/1992 | Shinoda ................. F24F 3/167 55/385.2 |
| 5,344,069 A | | 9/1994 | Narikiyo |
| 5,350,336 A | | 9/1994 | Chen et al. |
| 5,607,647 A | * | 3/1997 | Kinkead ................ A61L 9/046 422/177 |

(Continued)

FOREIGN PATENT DOCUMENTS

| | | |
|---|---|---|
| CN | 108019855 A | 5/2018 |
| JP | 62-5031 A | 1/1987 |

(Continued)

OTHER PUBLICATIONS

Extended European Search Report issued in European Application No. 19954717.5 dated Jul. 4, 2023 (13 pages).

(Continued)

*Primary Examiner* — Nelson J Nieves
(74) *Attorney, Agent, or Firm* — Crowell & Moring LLP

(57) ABSTRACT

An air conditioning system includes a first unit and a second unit. The space above the ceiling of each of a plurality of clean rooms is included in the chamber as a single space common to a plurality of the clean rooms. The first clean room is higher than the second clean room in air cleanliness.

8 Claims, 4 Drawing Sheets

(56) References Cited

U.S. PATENT DOCUMENTS

| | | | |
|---|---|---|---|
| 5,626,820 A * | 5/1997 | Kinkead | F24F 3/167 |
| | | | 55/318 |
| 5,992,493 A * | 11/1999 | Yasunaka | B32B 37/0007 |
| | | | 156/324 |
| 6,033,301 A * | 3/2000 | Suwa | F24F 3/167 |
| | | | 96/138 |
| 6,159,421 A | 12/2000 | Fujii | |
| 6,368,208 B1 | 4/2002 | Minoshima | |
| 6,368,393 B1 | 4/2002 | Hironaka | |
| 8,827,780 B1 * | 9/2014 | Benson | F24F 1/0067 |
| | | | 454/236 |
| 9,581,347 B2 | 2/2017 | Fiorita, Jr. | |
| 11,131,467 B2 | 9/2021 | Osheroff | |
| 2001/0041530 A1 * | 11/2001 | Hara | H01L 21/67772 |
| | | | 454/187 |
| 2002/0068524 A1 | 6/2002 | Nakagawa | |
| 2007/0253831 A1 | 11/2007 | Lee | |
| 2013/0324026 A1 * | 12/2013 | Fiorita, Jr. | B01L 1/04 |
| | | | 454/239 |
| 2022/0214071 A1 | 7/2022 | Tatsumi | |

FOREIGN PATENT DOCUMENTS

| | | | | |
|---|---|---|---|---|
| JP | 05322248 A | 12/1993 | | |
| JP | 6-307108 A | 11/1994 | | |
| JP | H0827045 B2 * | 3/1996 | | |
| JP | H09101050 A * | 4/1997 | | |
| JP | 10-96332 A | 4/1998 | | |
| JP | 2987990 B2 * | 12/1999 | | |
| JP | 2000-337675 A | 12/2000 | | |
| JP | 2001-56140 A | 2/2001 | | |
| JP | 2002-5485 A | 1/2002 | | |
| JP | 2002-147811 A | 5/2002 | | |
| JP | 2006-125812 A | 5/2006 | | |
| JP | 3963660 B2 * | 8/2007 | | |
| JP | 2009-58191 A | 3/2009 | | |
| JP | 4632806 B2 | 11/2010 | | |
| JP | 2011-47561 A | 3/2011 | | |
| JP | 4660816 B2 * | 3/2011 | | |
| JP | 2013-240358 A | 12/2013 | | |
| JP | 5615417 B2 | 10/2014 | | |
| JP | 2016-117003 A | 6/2016 | | |
| JP | 2017-48941 A | 3/2017 | | |
| JP | 2017-125641 A | 7/2017 | | |
| JP | 6501679 B2 * | 4/2019 | | |
| WO | WO-2017038484 A1 * | 3/2017 | | F24F 11/04 |

OTHER PUBLICATIONS

International Search Report (PCT/ISA/210) issued in PCT Application No. PCT/JP2019/047441 dated Mar. 3, 2020 with English translation (four (4) pages).

Japanese-language Written Opinion (PCT/ISA/237) issued in PCT Application No. PCT/JP2019/047441 dated Mar. 3, 2020 (five (5) pages).

Japanese-language International Preliminary Report on Patentability (PCT/IPEA/416 & PCT/IPEA/409) issued in PCT Application No. PCT/JP2019/047441 dated Oct. 12, 2021, including Annexes with English translation (19 pages).

Japanese-language Office Action issued in Japanese Application No. 2021-562255 dated Jun. 14, 2022 with English translation (10 pages).

Japanese-language Office Action issued in Japanese Application No. 2022-183115 dated Oct. 17, 2023 with English translation (7 pages).

* cited by examiner

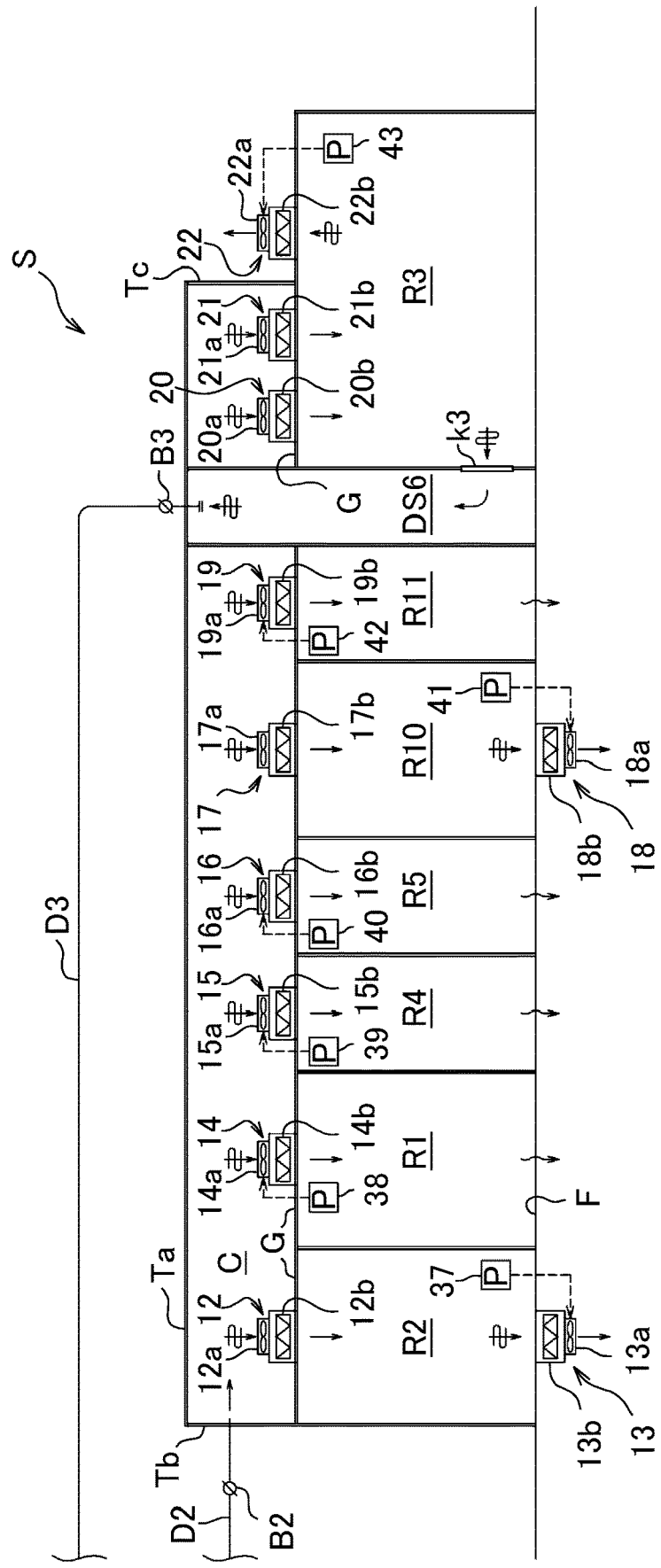

AIR CONDITIONING SYSTEM

CROSS REFERENCE TO RELATED APPLICATIONS

This application is a continuation of U.S. patent application Ser. No. 17/760,708, filed Mar. 15, 2022, which is a National Stage of International Application No. PCT/JP2019/047441, filed Dec. 4, 2019, the disclosure of which are expressly incorporated by reference herein.

TECHNICAL FIELD

The present invention relates to an air conditioning system.

BACKGROUND ART

A clean room high in air cleanliness is in frequent use not only for regenerative medicine or manufacturing of pharmaceutical products, but also for manufacturing of semiconductors or precision machines. With regard to an adjustment of a room pressure in a clean room of this type, there is known, for example, a technique that PTL 1 discloses. That is, Patent Document 1 discloses that "an air volume adjustment damper 20a is provided in a duct communicating with each of ceiling chambers 12a to 12e from a ceiling-embedded air conditioner 13, so that a desired amount of air supply is distributed to a corresponding one of the ceiling chambers 12a to 12e".

CITATION LIST

Patent Literature

PTL 1: JP 5615417 B2

SUMMARY OF INVENTION

Technical Problem

In the technique disclosed in PTL 1, the air volume adjustment damper is configured to adjust a room pressure of a clean room, while an air volume of each of a return-air side fan and a supply-air side fan is constant. With such a configuration, when changing an open degree of the air volume adjustment damper in order to maintain the room pressure of the clean room at a target value predetermined, air pressure loss in the duct occurs, causing a delay in response of the room pressure.

In addition to the delay in response, due to the air volume adjustment damper having a non-linear relationship between the opening degree and an air volume characteristic, an overshoot is prone to occur at the adjustment of the room pressure in the clean room. Accordingly, the technique disclosed in PTL 1 needs further improvement to maintain the room pressure at high accuracy. Further, the air conditioning system for air conditioning the clean room needs to be simplified.

In view of the respects described above, an object of the present invention is to provide an air conditioning system that maintains a room pressure in a clean room at high accuracy while having a simple configuration.

Solution to Problem

In order to solve the above problems, the present invention provides an air conditioning system that includes: a first unit including a first fan configured to supply air to a clean room from a chamber including a space above a ceiling of the clean room; and a second unit including a second fan configured to perform at least one of returning the air from the clean room through the chamber and exhausting the air from the clean room, and further includes: a pressure sensor provided in the clean room; and a control unit configured to control at least one of the first fan and the second fan based on a value detected by the pressure sensor. The space above the ceiling of each of a plurality of the clean rooms is included in the chamber as a single space common to a plurality of the clean rooms. Air having a prescribed adjusted temperature is drawn into the common space in the chamber, and then the first unit further draws the drawn air from the common space into each of a plurality of the clean rooms. A plurality of the clean rooms have respective target values of room pressure, one or more of the target room pressure values being different from each other. Of a plurality of the clean rooms, two or more clean rooms are present in which air is at least returned by the second fan, and the two or more clean rooms are equipped with respective duct shafts through which air is drawn therefrom to the chamber. Other features of the present invention will be described in embodiments.

Advantageous Effects of Invention

The present invention provides an air conditioning system that maintains a room pressure in a clean room at high accuracy while having a simple configuration.

BRIEF DESCRIPTION OF DRAWINGS

FIG. 5 is a diagram illustrating an arrangement of the plurality of fan filter units included in the air conditioning system according to the embodiment of the present invention.

DESCRIPTION OF EMBODIMENTS

Embodiment

Figure 1:
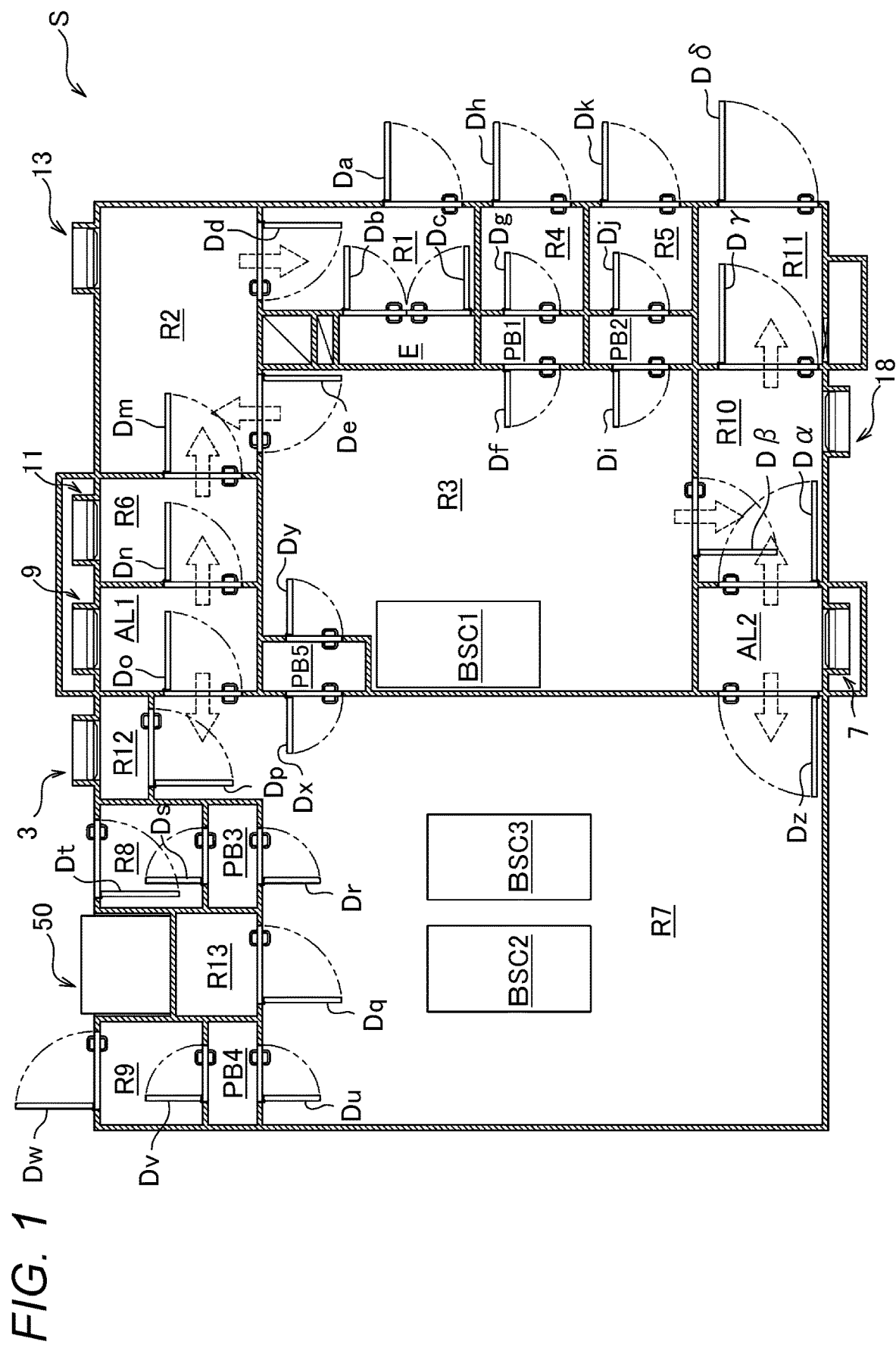
FIG. 1 is a diagram illustrating an each room layout in an air conditioning system according to an embodiment of the present invention.

FIG. 1 is a diagram illustrating an each room layout in an air conditioning system S according to an embodiment.

Note that, in FIG. 1, when a door predetermined (e.g., a door Dm) is open, a direction in which air flows is illustrated with a white broken-line arrow. In this embodiment, an adjustment of a room pressure in each room will be mainly described, but "air conditioning" here includes not only the adjustment of the room pressure in the room but also adjustments of a temperature and humidity of the air in the room. Alternatively, the "air conditioning" may only include the adjustment of the room pressure.

The air conditioning system S is a system to adjust the room pressure in each of a plurality of the rooms such as a pre-treatment room R3 (clean room) and a preparation room R7 (clean room). The air conditioning system S is provided, for example, in a regenerative medical facility. Generally, the air conditioning system S of this type is provided in the plurality of rooms, each having a different level of air cleanliness from the other(s). In each of the plurality of rooms, the room pressure is designed to be different from in rooms adjacent to the corresponding room. In this state, the air is less prone to leak from a room where the air cleanliness is lower to a room where the air cleanliness is higher.

As an example, in the pre-treatment room R3 in FIG. 1, each of the air cleanliness and the room pressure is higher than in a primary changing room R2. Accordingly, when an operator opens a door De to enter the pre-treatment room R3 from the primary changing room R2, as illustrated with the white broken-line arrow in FIG. 1, the air flows from the pre-treatment room R3 (where the room pressure is higher) to the primary changing room R2 (where the room pressure is lower). On the other hand, the air hardly flows in an opposite direction. With this configuration, dust is less prone to enter the pre-treatment room R3 from the primary changing room R2, so that the air cleanliness is maintained at a predetermined level in the pre-treatment room R3.

However, as the air flows, the room pressure in the primary changing room R2 temporarily increases, while the room pressure in the pre-treatment room R3 temporarily decreases. Whenever the door De is open/closed, the room pressure in each of the primary changing room R2 and the pre-treatment room R3 fluctuates. In view of this, in this embodiment, under control of each device as will be described later, the room pressure in each room is less prone to fluctuate.

Note that, in FIG. 1, each of the white broken-line arrows between two adjacent rooms represents the direction, in which the air flows from one room to the other room; and in this state, the room pressure is assumed to be higher in the one room than in the other room. Further, with regard to some of the plurality of rooms and doors denoted with reference signs in FIG. 1, a description thereof will be omitted as appropriate. For example, the description of some of the plurality of doors, Da to Dz, Dα, Dβ, Dγ, and Dδ will be omitted.

As illustrated in FIG. 1, a dressing room R1, the primary changing room R2, the pre-treatment room R3, an undressing room R10, and a front room R11 are provided to be adjacent to each other in this sequential order. In order to carry out an operation predetermined in the pre-treatment room R3, the operator moves through each of the rooms in the sequential order described above. The pre-treatment room R3 includes a biohazard cabinet BSC1 for handling a sample predetermined. The sample used in the biohazard cabinet BSC1 is brought in, sequentially through a front room R4 and a pass box PB1. On the other hand, a product (e.g., processed cell product) created in the biohazard cabinet BSC1 is taken out, sequentially through a pass box PB2 and a front room R5. Each of the pass boxes PB1 and PB2 is a space configured to control contamination (contamination of the sample).

Additionally, the dressing room R1, the primary changing room R2, a secondary changing room R6, an air lock AL1, the preparation room R7, an air lock AL2, the undressing room R10, and the front room R11 are provided to be adjacent to each other in this sequential order. In order to carry out an operation predetermined in the preparation room R7, the operator moves through each of the rooms in the sequential order described above. Each of the air locks AL1 and AL2 is a space configured to control entering of the dust into the preparation room R7 where the air cleanliness is higher. Thus, in the air locks AL1 and AL2, the room pressure is higher than in the other rooms.

Between the preparation room R7 and the pre-treatment room R3, the processed cell product or the like may be brought in and taken out through a pass box PB5. In the preparation room R7, the air cleanliness is higher than in the pre-treatment room R3, and the room pressure is also higher than in the pre-treatment room R3. Accordingly, the contamination is controlled when a door Dx or a door Dy is open.

As illustrated in FIG. 1, the preparation room R7 includes biohazard cabinets BSC2 and BSC3 for handling a sample predetermined. A product (e.g., processed cell product) created in each of the biohazard cabinets BSC2 and BSC3 is taken out, sequentially through a pass box PB3 and a front room R8. On the other hand, a waste or the like is taken out, sequentially through a pass box PB4 and a front room R9.

Note that, in FIG. 1, each of the dressing room R1, the primary changing room R2, the pre-treatment room R3, the front room R4, the front room R5, the secondary changing room R6, the preparation room R7, the front room R8, the front room R9, the undressing room R10, the front room R11, the air lock AL1, and the air lock AL2 corresponds to a "clean room". Fan filter units 3, 7, 9, 11, 13, and 18 along with an air handling unit 50, each illustrated in FIG. 1, will be described later.

Figure 2:
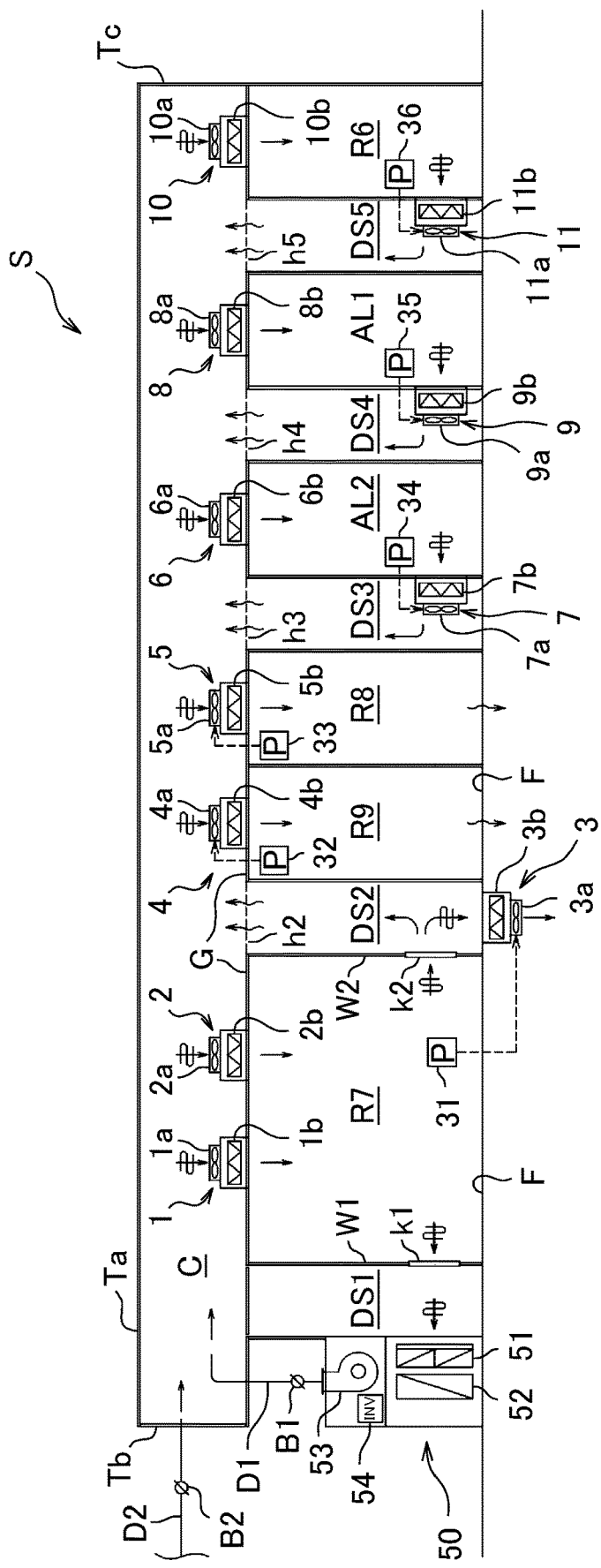
FIG. 2 is a diagram illustrating an arrangement of a plurality of fan filter units included in the air conditioning system according to the embodiment of the present invention.

FIG. 2 is a diagram illustrating an arrangement or the like of a plurality of the fan filter units.

Note that, in FIG. 2, the air flows in a direction illustrated with a solid-line arrow. FIG. 2 illustrates a part of the rooms in FIG. 1 (each room layout), and FIG. 5 illustrates a remaining part of the rooms in FIG. 1. Each of FIG. 2 and FIG. 5 is a schematic sectional view with a focus on a flow of the air; for example, the air is drawn from the preparation room R7 through a duct shaft DS2 into a chamber C.

While not illustrated in FIG. 1, a duct shaft DS1 in FIG. 2 is a space configured to draw the air from the preparation room R7 into the chamber C. Also, while not illustrated in FIG. 1, each of the duct shaft DS2, duct shafts, DS3, DS4, and DS5 is a space configured to draw the air from a room predetermined into the chamber C. Each of the duct shafts DS1 to DS5 is an air duct (not illustrated) provided in a gap space or the like between the rooms adjacent to each other.

As illustrated in FIG. 2, the air conditioning system S includes the air handling unit 50, the fan filter units 1, 2, 3, 4, 5, 6, 7, 8, 9, 10, and 11, together with pressure sensors 31, 32, 33, 34, 35, and 36.

The air handling unit 50 is a device to adjust the temperature or the like of the air. As illustrated in FIG. 2, the air handling unit 50 includes a filter 51, a cooling coil 52, a fan 53, and an inverter 54.

The filter 51 removes the dust from the air that is sucked in from the preparation room R7 through the duct shaft DS1. The cooling coil 52 is a heat exchanger to exchange heat between the air that has passed through the filter 51 and a refrigerant that flows through a heat transfer tube (not illustrated). The fan 53 is an air blower to force-feed the air (that has been subjected to the heat exchange in the cooling coil 52) into the chamber C through a duct D1. The inverter 54 controls a motor (not illustrated) as a drive source of the fan 53.

As illustrated in FIG. 2, the duct D1 connects a blow-out side of the fan 53 with the chamber C. The duct D1 is an air duct to draw the air, the temperature of which has been adjusted by the air handling unit 50, into the chamber C. The duct D1 includes a damper B1. The damper B1 is, for example, configured to have an opening degree predetermined at a test operation of the air conditioning system S. Subsequently, the damper B1 is configured to remain at the opening degree predetermined while the air conditioning system S is in operation.

In an example of FIG. 2, in addition to the duct D1 described above, a duct D2 draws the air, the temperature of which has been adjusted, into the chamber C. Note that, an air handling unit, which is additionally provided to adjust the temperature and the like of the air before supplying the air through the duct D2, has a known configuration, and thus, is not illustrated in FIG. 2. With this configuration, the air supplied through each of the ducts D1 and D2 is merged in the chamber C. The air flowing through the duct D1 at one side may have a different temperature from or may have a substantially equal temperature to the air flowing through the duct D2 at the other side.

The chamber C illustrated in FIG. 2 is a space provided between downstream ends of the ducts D1 to D2 and each of the rooms such as the preparation room R7. More specifically, the chamber C is formed of a ceiling G of each of the rooms such as the preparation room R7, an upper plate Ta, a side plate Tb and a side plate Tc. In the example of FIG. 2, the upper plate Ta is provided at a position higher than the ceiling G. The upper plate Ta has a plate surface substantially parallel to a surface of the ceiling G. The side plate Tb is provided to connect an edge of the ceiling G to an edge of the upper plate Ta at one side in a lateral direction (left side on the drawing of FIG. 2). Similarly, the side plate Tc is provided to connect an edge of the ceiling G to an edge of the upper plate Ta at the other side in the lateral direction (right side on the drawing of FIG. 2). The ceiling G and the upper plate Ta have a longitudinal distance between each other. The longitudinal distance is appropriately set at a design stage, to an extent not to hinder the flow of air through the chamber C.

The fan filter unit 1 (a first unit) is a device to supply the air to the preparation room R7 (clean room) from the chamber C that includes a space above the ceiling of the preparation room R7. The fan filter unit 1 is embedded in the ceiling G. The fan filter unit 1 includes a supply air fan 1a (first fan) and a filter 1b (first filter) in FIG. 2, in addition to a control device (not illustrated).

The supply air fan 1a is an air blower to supply the air from the chamber C to the preparation room R7, and includes a fan body and a fan motor (both not illustrated). The fan body of the supply air fan 1a is, for example, an axial fan such as a propeller fan. The fan motor of the supply air fan 1a is, for example, a direct current motor. The direct current motor may be a brushless direct current motor or a direct current motor with brush.

The filter 1b is a filter to remove the dust from the air blown out by the supply air fan 1a into the preparation room R7. The filter 1b is provided at a blow-out side of the supply air fan 1a. The filter 1b of this type employs, for example, a high efficiency particulate air filter (HEPA) or an ultra low penetration air filter (ULPA). The supply air fan 1a and the filter 1b are accommodated in a housing (not illustrated). The housing is fitted into an opening (not denoted with a reference sign in FIG. 2) of the ceiling G of the preparation room R7, and is fixed therein with a metal fixture or the like. Note that, the fan filter unit 2 as another fan filter unit provided in the ceiling G of the preparation room R7 has a similar configuration to the fan filter unit 1 previously described.

The fan filter unit 3 (second unit) is a device to return the air from the preparation room R7 through the chamber C, and to exhaust the air from the preparation room R7. Note that, to "return the air" from the preparation room R7 corresponds to returning at least a part of the air from the preparation room R7 to the preparation room R7.

Further, on the drawing in FIG. 2 that is simplified, the fan filter unit 3 is illustrated below a floor F of the preparation room R7; however, as illustrated in FIG. 1, the fan filter unit 3 is provided outside a wall of a space R12 that is adjacent to the preparation room R7 with a door Dp therebetween. As illustrated in FIG. 2, the fan filter unit 3 includes a return air fan 3a (second fan) and a filter 3b (second filter), in addition to a control device 3c (not illustrated in FIG. 2; see FIG. 3).

Figure 3:
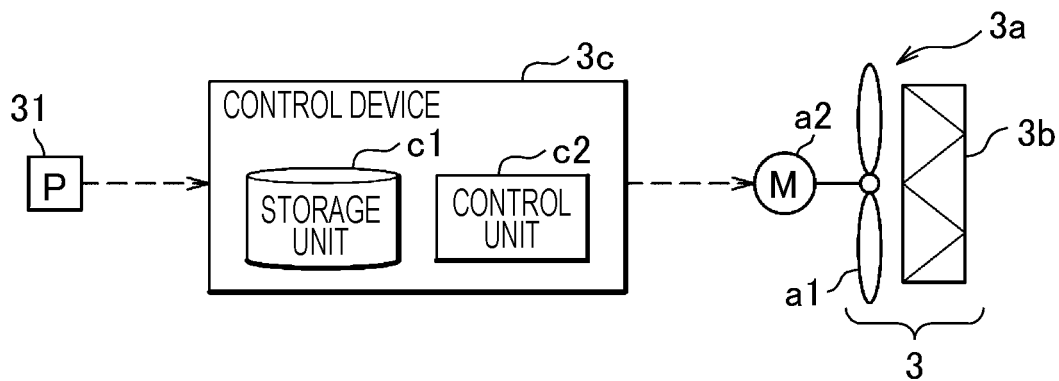
FIG. 3 is a configuration diagram regarding a control of one of the plurality of fan filter units included in the air conditioning system according to the embodiment of the present invention.

FIG. 3 is a configuration diagram regarding a control of the fan filter unit 3.

The return air fan 3a in FIG. 3 is an air blower to return the air from the preparation room R7 through the chamber C (see FIG. 2), and to exhaust the air from the preparation room R7. The return air fan 3a includes a fan body a1 and a fan motor a2. The fan body a1 of the return air fan 3a is, for example, the axial fan such as the propeller fan. The fan motor a2 of the return air fan 3a is, for example, the direct current motor.

The control device 3c is a device to control the fan motor a2 based on a value detected by the pressure sensor 31. The control device 3c is arranged, for example, in a vicinity of the fan motor a2. While not illustrated, the control device 3c includes a central processing unit (CPU), a read only memory (ROM), a random access memory (RAM), and various electronic circuits such as an interface. Here, a program stored in the ROM is read and developed in the RAM, and the CPU executes various processes.

As illustrated in FIG. 3, the control device 3c includes a storage unit c1 and a control unit c2. The storage unit c1 previously stores the program predetermined. The control unit c2 controls the fan motor a2 of the return air fan 3a at a value predetermined based on the value detected by the pressure sensor 31.

The control device 3c may include a programmable logic controller (PLC: not illustrated) connected thereto. In this case, based on a value inputted into the PLC (not illustrated) from other devices or sensors, the control device 3c may change an upper limit value and/or a lower limit value of rotational speed of the return air fan 3a to a value predetermined.

The filter 3b removes the dust from the air that is sucked in from the preparation room R7 by the return air fan 3a (see also FIG. 2). The filter 3b is provided at a suck-in side of the return air fan 3a. The filter 3b of this type employs, for example, the high efficiency particulate air filter (HEPA) or the ultra low penetration air filter (ULPA). The filter 3b also functions as a resistor (air resistor) when the air flows out from the preparation room R7. Thus, the filter 3b has an advantage in smoothly maintaining the room pressure of the preparation room R7 at a relatively high value.

The return air fan 3a and the filter 3b are accommodated in a housing (not illustrated). The housing is fitted into an opening (not denoted with a reference sign in FIG. 1) of the wall of the space R12 (see FIG. 1) previously described, and is fixed therein with the metal fixture or the like.

The pressure sensor 31 in FIG. 3 is a sensor to detect a pressure in the preparation room R7 (see FIG. 2), and is provided in the preparation room R7. The value detected by the pressure sensor 31 is outputted to the control device 3c. As a reference pressure for detecting the room pressure of the preparation room R7, a room pressure of a predetermined general room (not illustrated) may be used. The predetermined general room is provided outside each of the rooms in the air conditioning system S.

This embodiment describes, as an example, a case where the return air fan 3a has the rotational speed changed appropriately based on the value detected by the pressure sensor 31, whereas each of the supply air fan 1a and a supply air fan 2a in FIG. 2 has rotational speed at a value predetermined (fixed value).

Generally, the supply air fan 1a, the supply air fan 2a, and the return air fan 3a, each illustrated in FIG. 2, are constantly driven while the air conditioning system S is in operation. Each of the supply air fans 1a and 2a has an air volume (i.e., rotational speed) previously set such that the air in the preparation room R7 is ventilated at a predetermined frequency per unit time. Note that, as the ventilation frequency per unit time increases, the air cleanliness in the preparation room R7 is higher.

The return air fan 3a has the rotational speed changed appropriately, so that the air drawn by the supply air fans 1a and 2a flows out from the preparation room R7, and so that the room pressure in the preparation room R7 is maintained at a set pressure (target value of the room pressure) predetermined.

Each of a gap space k1 and a gap space k2 in FIG. 2 is an air passage through which the air flows out from the preparation room R7. The gap space k1 at one side is, for example, a gap space between a packing (not illustrated) at a lower end of a door Dq (see FIG. 1) that separates the preparation room R7 from a space R13 (see FIG. 1) and a surface of the floor of the preparation room R7. The space R13 in FIG. 1 communicates with a suck-in side of the air handling unit 50 through the duct shaft DS 1 (see FIG. 2). Here, a height of a lower end of the packing at the door Dq is adjustable such that the gap space k1 is appropriately adjusted in size.

In FIG. 2, the gap space k2 at the other side is, for example, a gap space between a packing (not illustrated) at a lower end of the door Dp that separates the preparation room R7 from the space R12 (see FIG. 1) and the surface of the floor of the preparation room R7. The space R12 in FIG. 1 communicates with the chamber C (see FIG. 2) through the duct shaft DS 2 (see FIG. 2), and concurrently communicates with the suck-in side of the return air fan 3a. Here, a height of the packing at the door Dp is adjustable such that the gap space k2 is adjusted in size. Each of the gap spaces k1 and k2 is appropriately adjusted in size (opening ratio) at the design stage or at the test operation, based on a capacity of the preparation room R7, the target value of the ventilation frequency or the room pressure, or others.

Further, in the example of FIG. 2, a thin plate h2 having a plurality of holes is provided at an upper end of the duct shaft DS2. While the return air fan 3a is driven, the air is drawn from the preparation room R7 through the gap space k2 to the duct shaft DS2, and a part of the air is returned to the chamber C through the plurality of holes in the thin plate h2. As has been described, the air from the preparation room R7 is returned through the chamber C. Thus, the air higher in air cleanliness is reused in the air conditioning for each of the rooms.

On the other hand, a part of the air drawn to a lower part of the duct shaft DS2 is sucked in by the return air fan 3a, and then, and is exhausted to the outside. In other words, the fan filter unit 2 (second unit) is arranged to suck in the air from the preparation room R7 through the gap space k2 that is predetermined and provided in a wall W2 (or the floor F) of the preparation room R7. In the arrangement, the fan filter unit 2 (second unit) returns a part of the air sucked in to the chamber C through the duct shaft DS2, while exhausting the air remaining.

Accordingly, when the return air fan 3a concurrently returns and exhausts the air from the preparation room R7, the preparation room R7 communicates with the chamber C through a suck-in side of each of the supply air fans 1a and 2a, and communicates with the chamber C through the suck-in side of the return air fan 3a. In this state, the return air fan 3a controls to adjust the room pressure of the preparation room R7 as will be described next.

For example, when the operator opens a door Do in FIG. 1, the room pressure is higher in the air lock AL1 than in the preparation room R7, and thus, the air flows from the air lock AL1 into the preparation room R7. As a result, the room pressure slightly increases in the preparation room R7. In response to the increase in room pressure of the preparation room R7, when the value detected by the pressure sensor 31 exceeds the target value of the room pressure in the preparation room R7, the control unit c2 (see FIG. 3) increases rotational speed of the fan motor a2 (see FIG. 3) to the value predetermined. Note that, a range of increase (and a range of decrease) in rotational speed of the fan motor a2 is calculated to be a value predetermined based on the program previously stored in the storage unit c1 (see FIG. 3).

Figure 4:
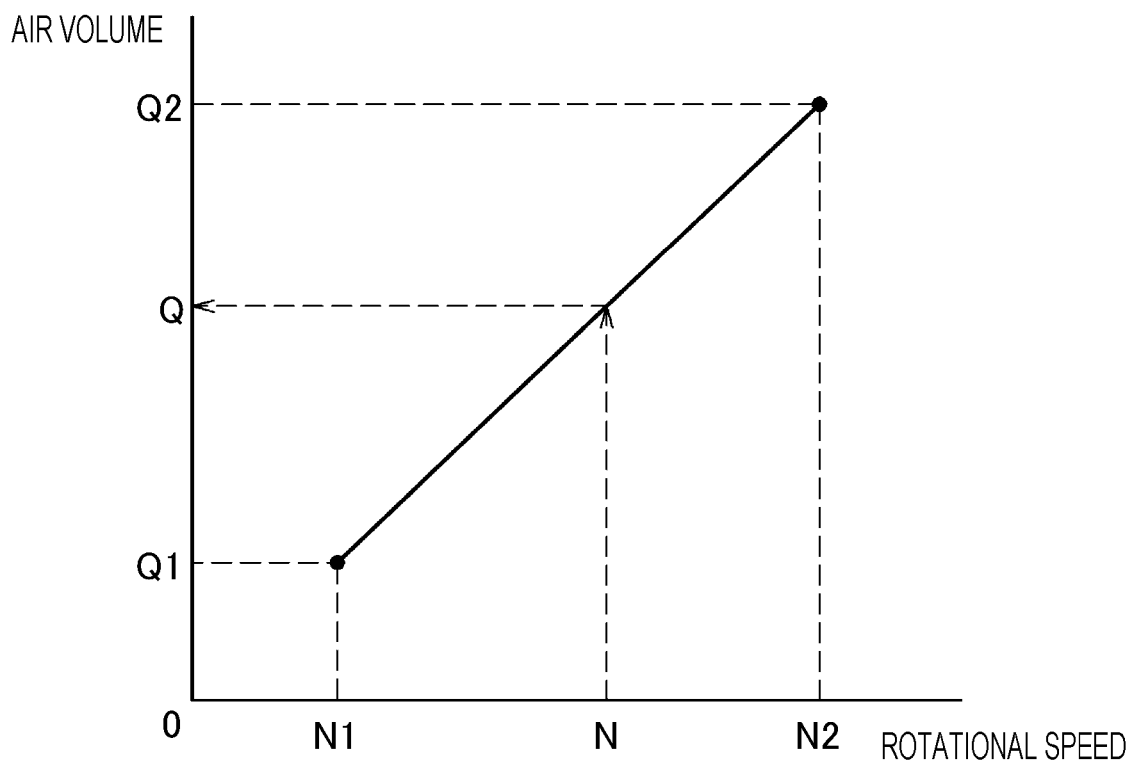
FIG. 4 is a characteristic graph showing a relationship between rotational speed and an air volume, the relationship held by a return air fan in the air conditioning system according to the embodiment of the present invention.

FIG. 4 is a characteristic graph showing a relationship between rotational speed of a return air fan and an air volume of the return air fan.

In FIG. 4, a horizontal axis represents the rotational speed of the return air fan 3a (i.e., the rotational speed of the fan motor a2), and the vertical axis represents an air volume of the return air fan 3a. As shown in FIG. 4, as the rotational speed of the return air fan 3a is higher, the air volume of the return air fan 3a is larger. The return air fan 3a has a linear relationship (proportional relationship) between the rotational speed and the air volume. Accordingly, the return air fan 3a has an advantage in finely adjusting the air volume more smoothly than in a case where a damper (not illustrated) is used to adjust an air volume, the damper having a non-linear relationship between an opening degree and an air volume characteristic. Note that, not only the return air fan 3a, but each of the supply air fans 1a and 2a also has a similar characteristic to the characteristic shown in FIG. 4.

As shown in FIG. 4, the return air fan 3a has a lower limit value N1 of the rotational speed, and a lower limit value Q1 of the air volume in correspondence to the lower limit value N1. Each of the lower limit value N1 and the lower limit value Q1 is previously set based on a predetermined specification. Similarly, the return air fan 3a has an upper limit value N2 of the rotational speed, and an upper limit value Q2 of the air volume in correspondence to the upper limit value N2; and each of the upper limit value N2 and the upper limit value Q2 is previously set. Particularly, with a focus on the lower limit value Q1 of the air volume of the return air fan 3a, a specific numerical example is 50 [$m^3/h$]; and the specific numerical example corresponds to approximately one third of a lower limit value (150 [$m^3/h$] approximately) of the air volume in the case where the damper (not illustrated) conventionally used adjusts the air volume. With this configuration, it is possible to drive the supply air fans 1a, 2a (see FIG. 2), or the return air fan 3a (see FIG. 2) with lower air volume. Thus, it is possible to reduce power consumption of the air conditioning system S more significantly than in the case where the damper (not illustrated) adjusts the air volume.

Further, the air volume is adjusted by the return air fan 3*a* that has the linear relationship between the rotational speed and the air volume characteristic. In this state, the air volume is finely adjusted even near the upper limit value or the lower limit value of the rotational speed. Accordingly, it is possible to drive the supply air fans 1*a*, 2*a* (see FIG. 2) or the return air fan 3*a* (see FIG. 2) with the low air volume, and concurrently to maintain the room pressure of the preparation room R7 at high accuracy.

For example, when the operator opens the door Do in FIG. 1 and the value detected by the pressure sensor 31 in the preparation room R7 exceeds the target value, as has been previously described, the control unit c2 (see FIG. 3) increases the rotational speed of the fan motor a2 (see FIG. 3) to the value predetermined. As a result, when the rotational speed of the return air fan 3*a* increases, a flow rate of the air flowing out from the preparation room R7 into the duct shaft DS2 (see FIG. 2) through the gap space k2 (see FIG. 2) increases per unit time. On the other hand, the supply air fan 2*a* is driven at the rotational speed predetermined (fixed value). As a result, in the preparation room R7, the room pressure having increased temporarily is returned to the target value predetermined. Particularly, even near the lower limit value Q1 in FIG. 4, the air volume of the return air fan 3*a* is finely adjusted. In this state, even with the low air volume, it is possible to maintain the room pressure of the preparation room R7 at high accuracy.

Further, for example, in FIG. 1, the room pressure is lower in the pass box PB5 than in the preparation room R7. Thus, when the operator opens the door Dx, the air flows from the preparation room R7 into the pass box PB5, and then, the room pressure slightly decreases in the preparation room R7. In response to the decrease in room pressure of the preparation room R7, when the value detected by the pressure sensor 31 goes below the target value of the room pressure, the control unit c2 (see FIG. 3) decreases the rotational speed of the fan motor a2 (see FIG. 3) to the value predetermined. As a result, in the preparation room R7, the room pressure having decreased temporarily is returned to the target value predetermined. Under such a control, the room pressure in the preparation room R7 is less prone to fluctuate, and the room pressure is maintained near the target value predetermined.

Note that, not only the return air fan 3*a* but also each of return air fans, 7*a*, 9*a*, and 11*a* (as will be described later) returns the air to the chamber C, causing the pressure in the chamber C to slightly fluctuate; however, the room pressure in each of the rooms is maintained without being significantly affected.

As illustrated in FIG. 2, the front room R9 includes the fan filter unit 4 embedded in the ceiling G. The front room R9 also includes the pressure sensor 32. Then, based on a value detected by the pressure sensor 32, rotational speed of a supply air fan 4*a* is controlled, so that the room pressure in the front room R9 is maintained at a target value predetermined. Note that, the supply air fan 4*a* has a similar configuration and control to the return air fan 3*a* previously described, and thus, a description thereof will be omitted.

In the example of FIG. 2, in the front room R9, an exhaust air fan (not illustrated) is not particularly provided at an exhaust air side. Further, on the drawing in FIG. 2, an arrow is illustrated to come out of the front room R9 downward through the floor F. Here, the air in the front room R9 is exhausted, for example, through a gap space between a packing (not illustrated) at a lower end of a door Dw (see FIG. 1) and a surface of the floor of the front room R9. Note that, the front room R8 as another front room has a similar configuration to the front room R9.

In FIG. 2, the air lock AL2 includes a supply air fan 6*a* (first fan) embedded in the ceiling G. The air lock AL2 includes the return air fan 7*a* (second fan) embedded in its side wall. The air lock AL2 further includes the pressure sensor 34 to detect the room pressure. Here, while the supply air fan 6*a* is driven at rotational speed predetermined (fixed value), the return air fan 7*a* is controlled (changed) in rotational speed such that the room pressure in the air lock AL2 is maintained at a target value predetermined. The air is blown out from the return air fan 7*a*, and blown sequentially through the duct shaft DS3 and a plurality of holes in a thin plate h3, before returned to the chamber C.

Accordingly, when the return air fan 7*a* (second fan) returns the air from the air lock AL2 (clean room), the air lock AL2 communicates with the chamber C through a suck-in side of the supply air fans 6*a* (first fans), and concurrently communicates with the chamber C through a blow-out side of the return air fan 7*a* (second fan).

Note that, unlike the return air fan 3*a*, the air blown out from the return air fan 7*a* is fully returned to the chamber C. Nonetheless, the return air fan 7*a* has a similar configuration and control to the return air fan 3*a* used in the air conditioning of the preparation room R7. Accordingly, it is possible to maintain the room pressure of the air lock AL2 at high accuracy, and concurrently to reuse the air relatively high in air cleanliness for the air conditioning in each of the rooms.

Each of the air lock AL1 and the secondary changing room R6 controls the room pressure in a similar manner to the preparation room R7 controlling the room pressure. Thus, a detailed description thereof will be omitted. Next, with regard to the remaining part of the rooms in FIG. 1, which is not illustrated in FIG. 2, the air conditioning in each of the rooms will be described.

FIG. 5 is a diagram illustrating the arrangement of the plurality of fan filter units or the like.

Note that, the ceiling G in FIG. 5 is the same as the ceiling G in FIG. 2. Also, the chamber C in FIG. 5 is the same as the chamber C in FIG. 2.

A fan filter unit 12 (first unit) is a device to supply the air from the chamber C to the primary changing room R2, and is embedded in the ceiling G. The fan filter unit 12 has a similar configuration to the fan filter unit 1 in the preparation room R7 (see FIG. 2); thus, a description thereof will be omitted.

The fan filter unit 13 (second unit) is a device to exhaust the air from the primary changing room R2. In an example of FIG. 5, the fan filter unit 13 is not used to return the air, unlike the fan filter units 3, 7, 9, and 11 (see FIG. 2) previously described. Further, on the drawing in FIG. 5 that is simplified, the fan filter unit 13 is illustrated below the floor F of the primary changing room R2; however, as illustrated in FIG. 1, the fan filter unit 13 is embedded in a wall that separates the primary changing room R2 from the outside.

The fan filter unit 13 includes an exhaust air fan 13*a* (second fan) and a filter 13*b* (second filter) in FIG. 5, in addition to a control device (not illustrated). The primary changing room R2 further includes a pressure sensor 37 to detect the room pressure. Then, based on a value detected by the pressure sensor 37, the control device (not illustrated) controls rotational speed of the exhaust air fan 13*a*, so that the room pressure in the primary changing room R2 is maintained at a target value predetermined.

Note that, to "exhaust the air" and to "return the air" coincide with each other in releasing the air from each of the rooms. Accordingly, the control of the return air fan 3a in the preparation room R7 (see FIG. 2) is similarly applicable to the exhaust air fan 13a (see FIG. 5). Further, the control is similarly applicable to the undressing room R10 in FIG. 5.

Note that, the "second unit" includes the "second fan" configured to perform at least one of returning the air from the "clean room" through the chamber C and exhausting the air from the "clean room". The "second unit" corresponds to the fan filter units 3, 7, 9, 11, and 13 (see FIG. 2) as well as the fan filter units 18 and 22 (see FIG. 5).

In FIG. 5, each of the dressing room R1, the front room R4, the front room R5, and the front room R11 has a similar configuration in the air conditioning to the front room R9 (see FIG. 2), and thus, a description thereof will be omitted.

In FIG. 5, the pre-treatment room R3 includes fan filter units 20, 21, and 22 embedded in the ceiling G. The fan filter units 20 and 21 respectively include a supply air fan 20a and a supply air fan 21a, the suck-in sides of the supply air fan 20a and the supply air fan 21a communicate with the chamber C. On the other hand, the fan filter unit 22 includes an exhaust air fan 22a, the blow-out side of which is open to the outside. The pre-treatment room R3 further includes a pressure sensor 43. Then, based on a value detected by the pressure sensor 43, rotational speed of the exhaust air fan 22a is controlled, so that the room pressure in the pre-treatment room R3 is maintained at a target value predetermined.

In the example of FIG. 5, each of the supply air fans 20a and 21a is driven to supply the air to the pre-treatment room R3, and the exhaust air fan 22a exhausts a part of the air supplied. Then, the remaining air is drawn sequentially through a gap space k3, a duct shaft DS6, and a duct D3, before drawn into a suck-in side of an air handling unit (not illustrated). The duct D3 is an air duct to draw the air from the chamber C into the air handling unit (not illustrated). The air handling unit (not illustrated) described above is a device to adjust the temperature and the like of the air before supplying the air through the duct D3. The duct D3 includes a damper B3. The damper B3 has an opening degree set at a value predetermined at the test operation, and then remains at the opening degree predetermined.

Effect

According to this embodiment, for example, the supply air fans 1a and 2a (see FIG. 2) supplies the air to the preparation room R7 (see FIG. 2), while the return air fan 3a controls to maintain the room pressure at the value predetermined in the preparation room R7. Accordingly, a duct (not illustrated) to draw the air into the preparation room R7 or a duct (not illustrated) to draw the air out from the preparation room R7 is not necessarily required, thereby simplifying the configuration of the air conditioning system S. With this configuration, in the chamber C, a gas piping system predetermined (not illustrated) is easily provided, or a communication line or a power line is easily routed out.

Further, as compared with the case where the duct (not illustrated) is provided in the chamber C, a period required to install the air conditioning system S is reduced, thereby resulting in cost reduction in the installation. This configuration is easily applicable in a restricted installation space, such as a building that accommodates a plurality of facilities.

In the conventional configuration where the damper (not illustrated) provided in the duct (not illustrated) adjusts the room pressure, due to an air pressure loss in the duct or the damper having the non-linear relationship between the opening degree and the air volume characteristic, a delay in response or an overshoot is prone to occur at the adjustment of the room pressure in each of the clean rooms. In view of these respects, in this embodiment, in the preparation room R7 (see FIG. 2) for example, the return air fan 3a adjusts the room pressure, and thus, the air pressure loss or the delay in response hardly occurs. Here, the return air fan 3a or others has the linear relationship between the rotational speed and the air volume characteristic (see FIG. 4), so that the room pressure in the preparation room R7 is maintained at high accuracy. Note that, each of the other rooms has a similar configuration to the preparation room R7.

Additionally, in the conventional technique where the damper (not illustrated) adjusts the room pressure, it is difficult to finely adjust the air volume near an upper limit value or a lower limit value of the opening degree of the damper. This configuration causes a restriction in a variable range of the air volume. In view of this, in this embodiment, for example, the return air fan 3a has a relatively wide range between the lower limit value Q1 (see FIG. 4) and the upper limit value Q2 (see FIG. 4) in the air volume. The return air fan 3a is capable of finely adjusting the air volume even near the lower limit value Q1 or the upper limit value Q2. Thus, even with low air volume near the lower limit value Q1, the room pressure is controlled at high accuracy, thereby reducing the power consumption significantly in the air conditioning system S.

Additionally, each of the supply air fans 1a, 2a, the return air fan 3a, and others employs a direct current motor, so that even in other countries with different specifications for current or voltage, the air conditioning system S is applicable by using a transformer or the like, without substantially changing the configuration.

In the air conditioning system S with the simple configuration, each of the clean rooms (e.g., the preparation room R7 in FIG. 2) has an independent (self-contained) configuration and control system to adjust the room pressure. Accordingly, the air conditioning system S is highly flexible in design and may be additionally installed without difficulty. As has been described above, this embodiment provides the air conditioning system S that maintains the room pressure in each of the clean rooms (e.g., the preparation room R7) at high accuracy while having a simple configuration, and thus, contributes to social benefits.

Modification

An air conditioning system S according to an embodiment of the present invention has been described above; however, the present invention is not limited thereto, and thus various modifications and changes may be made.

For example, the embodiment concerns a case where a return air fan 3a adjusts a room pressure in a preparation room R7 (see FIG. 2) or a case where an exhaust air fan 13a adjusts a room pressure in a primary changing room R2 (see FIG. 5); however, the present invention is not limited thereto.

In other words, in a configuration including a "first fan" that supplies air to a clean room and a "second fan" that performs at least one of returning the air from the clean room and exhausting the air from the clean room, the "first fan" may be controlled (changed in rotational speed) and the "second fan" may be kept constant in rotational speed. With such a configuration, when a room pressure in the clean room exceeds a target value, a "control unit" is configured to decrease the rotational speed of the "first fan" to a predetermined value. On the other hand, when the room pressure in the clean room goes below the target value, the "control unit" increases the rotational speed of the "first fan" to the predetermined value. Even with such a configuration, the room pressure in the clean room is maintained at high accuracy.

Alternatively, the "control unit" may control both the "first fan" and the "second fan". With such a configuration, when the room pressure in the clean room exceeds the target value, the "control unit" decreases (or maintains) the rotational speed of the "first fan" while increasing the rotational speed of the "second fan". On the other hand, when the room pressure in the clean room goes below the target value, the "control unit" increases (or maintains) the rotational speed of the "first fan", while decreasing the rotational speed of the "second fan". Accordingly, the "control unit" may control at least one of the "first fan" and the "second fan" in rotational speed. Even with such a configuration, the room pressure in the clean room is maintained at high accuracy.

When three or more of the clean rooms, each defined by a wall including a door, are provided, one of the three or more of the clean rooms may correspond to a clean room predetermined. The clean room predetermined is adjacent to two or more of the three or more of the clean rooms. Here, any one of set pressures (target values of room pressures) in the two or more of the three or more of the clean rooms is lower than a set pressure in the clean room predetermined (e.g., each of air locks AL1 and AL2 in FIG. 1). As has been previously described, each of the clean rooms has an independent system to control the room pressure. Accordingly, it is possible to provide such an arrangement of rooms. In the arrangement of rooms, for example, with the air lock AL2 (see FIG. 2), a fan filter unit 7 at a return-air side has a filter 7b functioning as a resistor when the air flows, so that the air lock AL2 has an advantage in maintaining the room pressure at a relatively high value.

Alternatively, when three or more of the clean rooms, each defined by a wall including a door, are provided, one of the three or more of the clean rooms may correspond to a clean room predetermined, the clean room predetermined adjacent to two or more of the three or more of the clean rooms. In this case, any one of the set pressures (target values of the room pressures) in the two or more of the three or more of the clean rooms is higher than the set pressure in the clean room predetermined. As has been previously described, each of the clean rooms has an independent system to control the room pressure. Accordingly, it is possible to provide such an arrangement of rooms.

Additionally, a clean room where the "second fan" (e.g., the return air fan 3a: see FIG. 2) returns the air from the clean room and exhausts the air from the clean room, such as the preparation room R7 (see FIG. 2), and a clean room where a "second fan" of another type (e.g., a return air fan 7a: see FIG. 2) returns the air from the clean room, such as the air lock AL2 (see FIG. 2) may be concurrently provided. Here, in addition to a duct D3 (see FIG. 5) configured to exhaust the air, the return air fans 3a, 7a, and others exhaust the air. In this state, pressure in a chamber C is less prone to fluctuate, and the room pressure in each of the clean rooms is maintained at high accuracy. The air from each of the clean room is returned, so that the air higher in air cleanliness is reused.

Further, the clean room where the "second fan" (e.g., the return air fan 3a: see FIG. 2) concurrently returns the air from the clean room and exhausts the air from the clean room, such as the preparation room R7 (see FIG. 2), and a clean room where a "second fan" of another type (e.g., the exhaust air fan 13a: see FIG. 5) exhausts the air from the clean room, such as the primary changing room R2 (see FIG. 5) may be concurrently provided. In this state, the pressure in the chamber C is less prone to fluctuate, and the room pressure in each of the clean rooms is maintained at high accuracy.

Further, in this case, in the clean room where the second fan returns the air from the clean room and exhausts the air from the clean room, such as the preparation room R7 (see FIG. 2), ventilation frequency per unit time may be higher than ventilation frequency in the clean room where the second unit fan only exhausts the air, such as the primary changing room R2 (see FIG. 5). Then, it is possible, for example, to reuse a part of the air from the preparation room R7 (that is higher in air cleanliness) in the air conditioning for each of the clean rooms.

As another case, the clean room where the "second fan" (e.g., the return air fan 7a: see FIG. 2) returns the air from the clean room, such as the air lock AL2 (see FIG. 2), and the clean room where the "second fan" of another type (e.g., the exhaust air fan 13a: see FIG. 5) exhausts the air from the clean room, such as the primary changing room R2 (see FIG. 5), may be concurrently provided. In this state, the pressure in the chamber C is less prone to fluctuate, and the room pressure in each of the clean rooms is maintained at high accuracy.

In the foregoing embodiment, each of fans including a supply air fan 1a, a supply air fan 2a, and the return air fan 3a is an axial fan; however, the present invention is not limited thereto. In other words, each of the fans including the supply air fan 1a, the supply air fan 2a, and the return air fan 3a may employ a mixed flow fan, a cross flow fan, a centrifugal fan or others.

In the foregoing embodiment, the drive source of each of the fans including the supply air fan 1a, the supply air fan 2a, and the return air fan 3a is driven by a direct current motor; however, the present invention is not limited thereto. In other words, the drive force of each of the fans including the supply air fan 1a, the supply air fan 2a, and the return air fan 3a may be driven by an AC motor such as a synchronous motor.

In the foregoing embodiment, a filter 1b included in a fan filter unit 1 employs an HEPA or an ULPA; however, the present invention is not limited thereto. In addition to the HEPA or the ULPA, the filter 1b in the fan filter unit 1 may employ a tetrafluoroethylene resin (PTFE) filter or others.

In the foregoing embodiment, for example, in air conditioning of the preparation room R7, each of the supply air fans 1a and 2a has a control device (not illustrated), and the return air fan 3a has a control device 3c (see FIG. 3) separately; however, the present invention is not limited thereto. In other words, the supply air fans 1a, 2a and the return air fan 3a may be connected to a single control device (not illustrated). Further, each of the fans used in the air conditioning of a plurality of the clean rooms may be controlled by a single control device (not illustrated).

In the foregoing embodiment, in a pre-treatment room R3 (see FIG. 1) or the preparation room R7 (see FIG. 1) where the sample is handled, the room pressure is higher (in other words, the room has a more positive pressure) than in each of the other rooms except the air locks AL1 and AL2 (see FIG. 1); however, the present invention is not limited thereto. In other words, the foregoing embodiment may be applied to a case where, in a clean room as a working space in production processes such as a medical facility or an animal experiment facility, a room pressure is lower than (in other words, the clean room has a more negative pressure) than in each of the other rooms.

Further, in the foregoing embodiment, as an example, the air conditioning system S has been described in a case of being used in a regenerative medical facility, but the present invention is not limited thereto. In other words, the foregoing embodiment is applicable to various fields, such as manufacturing of industrial products, the food industry, or manufacturing of pharmaceutical products.

It should be noted that a detailed description in the foregoing embodiment is to be considered in all respects as merely illustrative for convenience of description, and thus is not restrictive. Any addition, removal, and replacement of another configuration may be appropriately made to, from, and with configurations in the foregoing embodiment.

Further, the foregoing mechanisms and configurations are considered to be necessary for description purposes, and thus do not represent all the mechanisms and configurations of the product.

REFERENCE SIGNS LIST 1, 2, 4, 5, 6, 8, 10, 12, 14, 15, 16, 17, 19, 20, 21 fan filter unit (first unit)
3, 7, 9, 11, 13, 18, 22 fan filter unit (second unit)
1a, 2a, 4a, 5a, 6a, 8a, 10a, 12a, 14a, 15a, 16a, 17a, 19a, 20a, 21a supply air fan (first fan)
1b, 2b, 4b, 5b, 6b, 8b, 10b, 12b, 14b, 15b, 16b, 17b, 19b, 20b, 21b filter (first filter)
3a, 7a, 9a, 11a return air fan (second fan)
3b, 7b, 9b, 11b filter (second filter)
13a, 18a, 22a exhaust air fan (second fan)
13b, 18b, 22b filter (second filter)
31, 32, 33, 34, 35, 36, 37, 38, 39, 40, 41, 42, 43 pressure sensor
3c control device
a1 fan body
a2 fan motor (direct current motor)
c1 storage unit
c2 control unit
AL1, AL2 air lock (clean room)
C chamber
Da, Db, Dc, Dd, De, Df, Dg, Dh, Di, Dj, Dk, Dm, Dn, Do, Dp, Dq, Dr, Ds, Dt, Du, Dv, Dw, Dx, Dy, Dz, Dα, Dβ, Dγ door
DS1, DS2, DS3, DS4, DS5, DS6 duct shaft
F floor
G ceiling
k2 gap space
R1 dressing room (clean room)
R2 primary changing room (clean room)
R3 pre-treatment room (clean room)
R4, R5, R8, R9, R11 front room (clean room)
R6 secondary changing room (clean room)
R7 preparation room (clean room)
R10 undressing room (clean room)
S air conditioning system
W1 wall

The invention claimed is:

1. An air conditioning system, comprising:
a first unit including a first fan configured to supply air to a first clean room of a plurality of clean rooms from a chamber including a space above a ceiling of the first clean room; and
a second unit including a second fan configured to return the air from the first clean room through the chamber,
wherein the space above the ceiling of each of the plurality of clean rooms included in the chamber is a single space common to the plurality of the clean rooms,
wherein each of the plurality of clean rooms includes the first clean room in which the second unit is configured to return air from the first clean room to the chamber via a duct shaft, and also includes a second clean room in which the air is exhausted from the first clean room to outside thereof, without using any duct shaft, and
wherein the first clean room is higher than the second clean room in air cleanliness, and
wherein air in the second clean room is not returned to the chamber.

2. The air conditioning system according to claim 1, wherein
the second clean room is provided with a third unit including a third fan configured to exhaust the air from the second clean room.

3. The air conditioning system according to claim 1, wherein
the first clean room communicates with the chamber through a suck-in side of the first fan, and concurrently communicates with the chamber through a blow-out side of the second fan.

4. The air conditioning system according to claim 1, wherein
the first unit includes a first filter configured to remove dust from air that the first fan has blown into the first clean room, and
the second unit includes a second filter configured to remove dust from air that the second fan has sucked in from the first clean room.

5. The air conditioning system according to claim 4, wherein
the plurality of clean rooms includes at least three clean rooms, each defined by a wall including a door,
one of the at least three clean rooms corresponds to the first clean room,
the first clean room is adjacent to two or more of the at least three clean rooms, and
any one of set pressures in the two or more of the at least three clean rooms is lower than a set pressure in the first clean room.

6. The air conditioning system according to claim 4, wherein
the plurality of clean rooms includes at least three clean rooms, each defined by a wall including a door,
one of the at least three clean rooms corresponds to the first clean room,
the first clean room is adjacent to two or more of the at least three clean rooms, and
any one of set pressures in the two or more of the at least three clean rooms is higher than a set pressure in the first clean room.

7. An air conditioning system, comprising:
a first clean room;
a second clean room, the first clean room being higher than the second clean room in air cleanliness;
a plurality of first units, each of which includes a first fan, the first fan being configured to supply air, to each of the first clean room and the second clean room, from a chamber including a space above a ceiling of each of the first clean room and the second clean room, the space above the respective ceilings being a single space; and a second unit including a second fan configured to return the air from the first clean room through the chamber, wherein the air in the first clean room is returned to the chamber via a duct shaft using the second unit, the air in the second clean room is exhausted to outside thereof, without using any duct shaft, and the air in the second clean room is not returned to the chamber.

8. The air conditioning system according to claim 7, wherein air in the first clean room is directly drawn to the duct shaft using the second fan embedded in a side wall of the first clean room.

* * * * *